Jan. 13, 1925.
P. M. COOK ET AL
1,522,867
PAN OILING DEVICE
Filed April 17, 1923  3 Sheets-Sheet 1
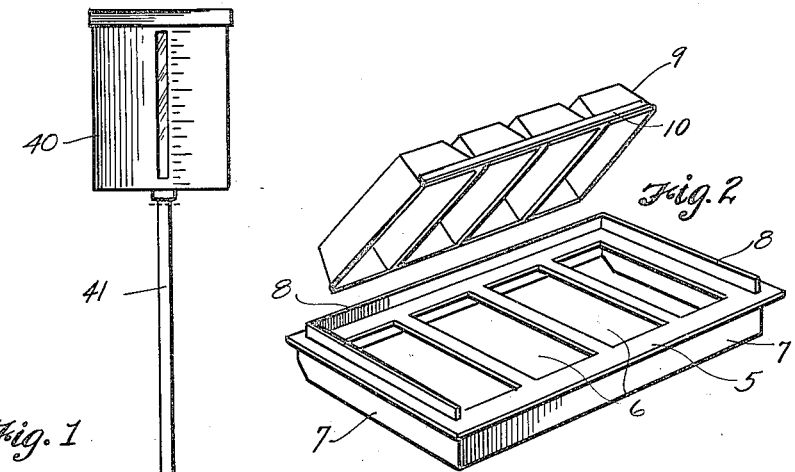
Fig. 2
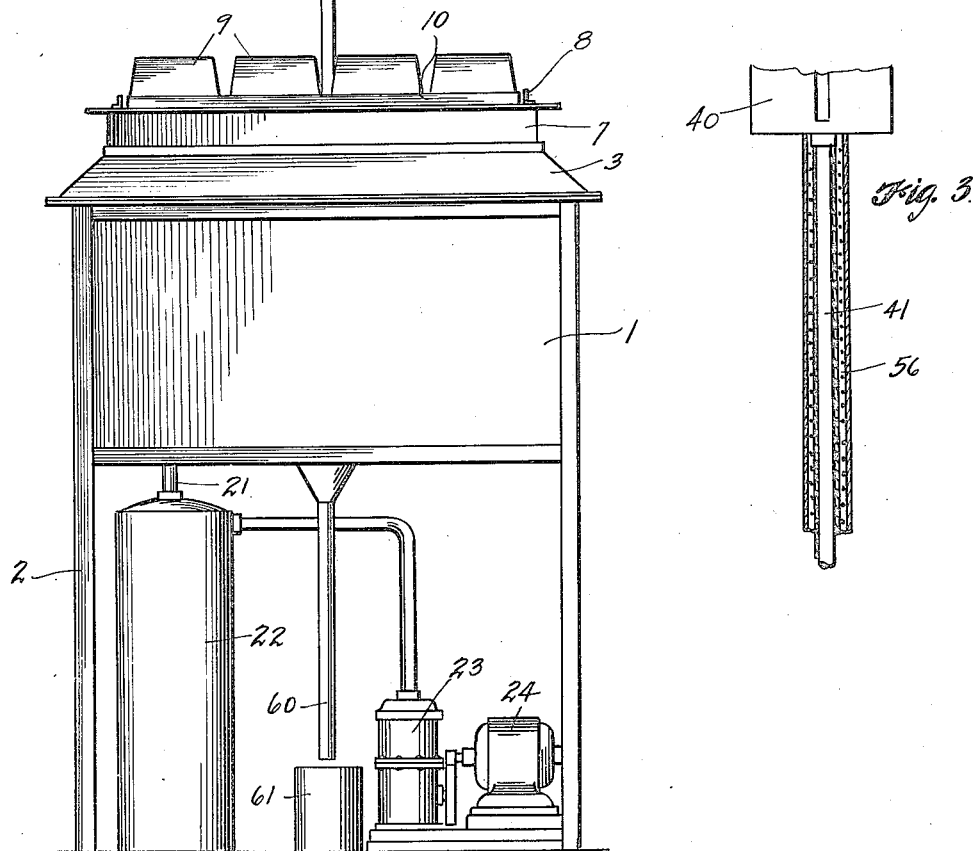
Fig. 1
Fig. 3
INVENTOR
PEARL M. COOK
G. E. RASMUSSEN
G. W. SKINNER
Richard J. Cook
ATTORNEY

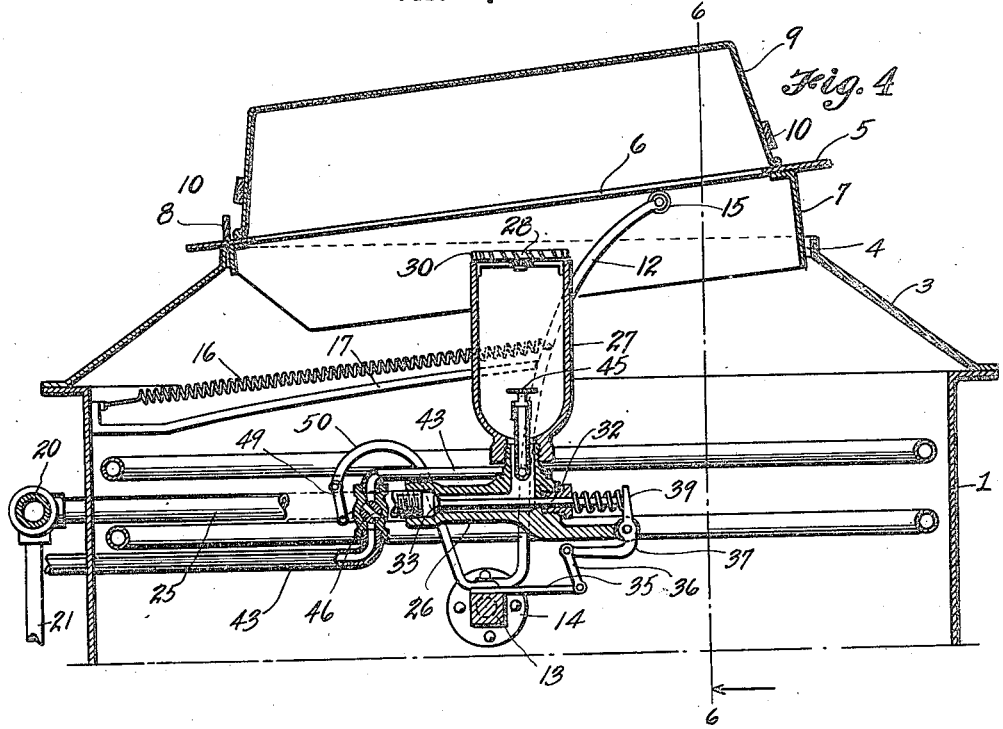
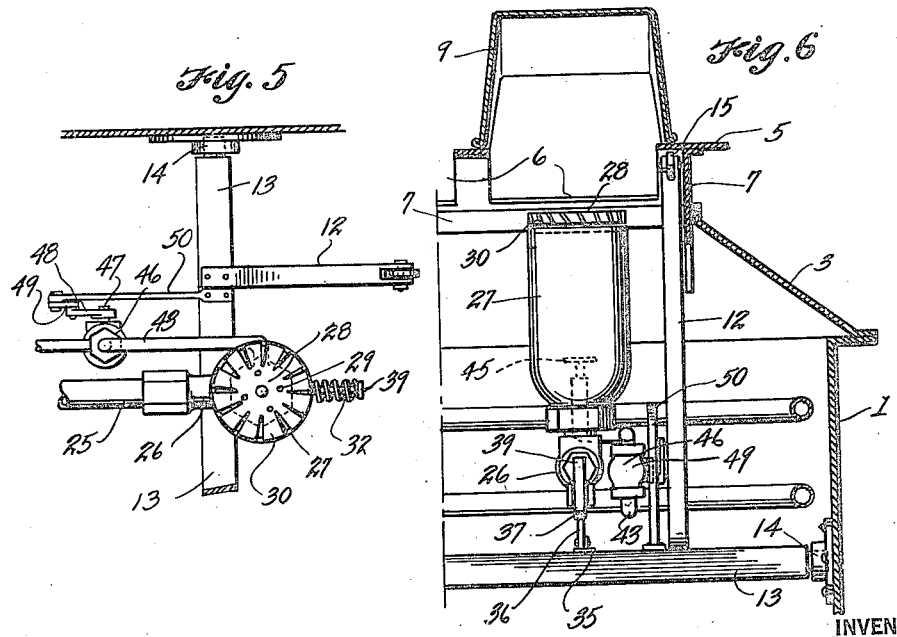

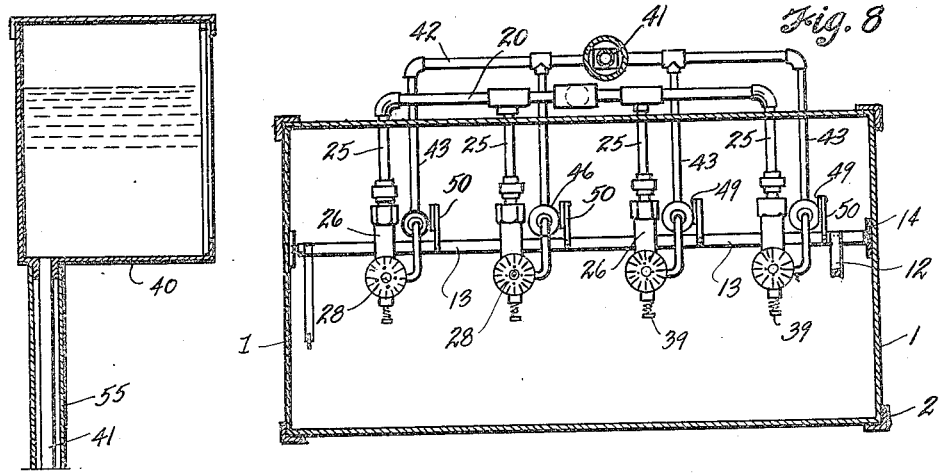
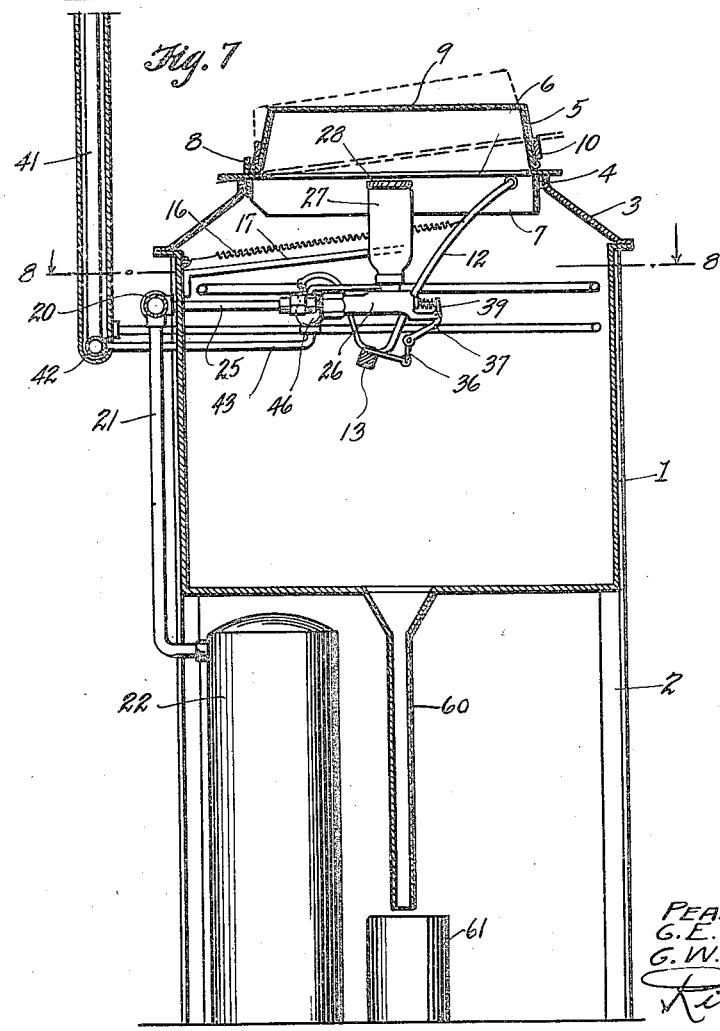

Patented Jan. 13, 1925.

1,522,867

UNITED STATES PATENT OFFICE.

PEARL M. COOK, GUST E. RASMUSSEN, AND GILBERT W. SKINNER, OF SEATTLE, WASHINGTON.

PAN-OILING DEVICE.

Application filed April 17, 1923. Serial No. 632,757.

*To all whom it may concern:*

Be it known that we, PEARL M. COOK, GUST E. RASMUSSEN, and GILBERT W. SKINNER, citizens of the United States, and residents of Seattle, King County, Washington, have invented certain new and useful Improvements in Pan-Oiling Devices, of which the following is a specification.

This invention relates to pan oiling devices, and more particularly to devices of that character for use in bakeries or like places, for oiling the pans wherein loaves of bread are baked in order that the bread will not stick to the pans and can be easily removed therefrom.

It is the practice in some bakeries to oil, or grease, the pans by hand, but this is a very slow and otherwise unsatisfactory method as the oil or grease cannot be evenly applied. For this, and other reasons, it has been the object of this invention to provide means whereby oil may be applied in an even and satisfactory manner and whereby the work is greatly expedited.

More specifically stated, it is the object of the invention to provide bread pan oiling means of the above character wherein the oil is blown by means of air under pressure, in a finely atomized condition into several pans simultaneously, and wherein means is provided for automatically and simultaneously opening the oil and air delivery jets when the pans are moved into oiling position and whereby they are closed when the pans are removed so that there is no waste of oil.

Another object resides in the provision of means whereby the oil is atomized and in the provision of means for throwing the atomized oil over all inner surfaces of the pans.

Other objects of the invention reside in the various details of construction of the parts embodied in the construction and in their combination and mode of operation.

In accomplishing these and other objects of the invention we have provided the improved details of construction, the preferred forms of which are illustrated in the accompanying drawings wherein—

Fig. 1 is a front elevation of a pan oiling device constructed in accordance with the present invention.

Fig. 2 is a perspective view of a pan supporting die removed from the device, and a set of pans in inverted relation above the die.

Fig. 3 is a fragmental view of a part of the oil container and its delivery pipe, with an electric coil enclosing the pipe for the purpose of retaining it hot.

Fig. 4 is an enlarged, transverse section through the oiling device, particularly illustrating the oil and air control valves and their operating mechanism.

Fig. 5 is a plan view of one of the oiling units.

Fig. 6 is a sectional view, taken on the line 6—6 in Fig. 4.

Fig. 7 is a vertical section taken centrally through the device, illustrating the air and oil connections with the delivery mechanism and control valves.

Fig. 8 is a horizontal section, taken on the line 8—8 in Figure 7, showing the spacing of the several units of the device.

Referring more in detail to the several views of the drawings wherein like reference numerals designate the same or like parts—

1 designates a rectangular, box like housing, preferably constructed of sheet metal, and supported at a suitable working height by means of angle iron legs 2 at its four corners. The housing is provided with a cover 3 with a central opening 4 within which a pan supporting die 5 is removably mounted and which consists of a flat sheet metal plate provided with a plurality of openings 6 and having depending flanges 7 extended from its under side which fit within the opening 4 to retain the die properly in place and which prevent the atomized oil from being thrown outside the housing when the die is in raised position. Along the opposite side and back edges of the plate are upwardly extending flanges 8 whereby the bread pans 9 are retained properly in registration with the die openings when the oil is being applied thereto.

To insure rapidity in handling the pans to be oiled, they are fastened together in sets of four, as shown in Figure 2, by means of bars 10 secured to their ends. For pans of different size, dies of different size would be provided. The present illustration shows a die suitable for four pans and there are four oiling devices embodied in the mechanism and these are properly located as to deliver the oil through the die openings and into the pans located thereover.

The die is normally supported from its rearward edge along the rearward edge of the opening 4 in top 3, so that it may be moved pivotally thereon. It is yieldably retained in an upwardly and forwardly inclined position, as is shown best in Figure 4, by means of lever arms 12—12' that are fixed at their lower ends to a cross rod 13, supported rotatably at its ends in bearings 14, fixed to the opposite end walls of the housing 1, and at their upper ends have rollers 15 engaging in rolling contact with the under surface of the die plate 5. Springs 16 are attached to the lever arms and to a wall of the housing to retain the levers normally against stop bars 17. The arrangement of parts is such that when the die is pressed downwardly the levers 12—12' will be swung downwardly and this movement will effect partial rotation of the cross rod 13 which, by means of mechanism presently described, controls the delivery of oil to the pans.

At the back of the housing is a pipe header 20 which is connected by means of a pipe 21 with a tank 22 wherein air is stored under pressure. The tank may be filled by means of a pump 23 operated by an electric motor, as at 24, all of which parts are located beneath the housing. Leading into the housing from the header are four air delivery pipes 25 that connect at their inner ends with valve housings 26 located centrally beneath the openings 6 in die plate 5, and above the cross rod 13. Upwardly opening cups 27 are mounted on each of the valve housings to receive air at their lower ends, and each is provided over its upper end with a rotatably supported disk 28 having perforations 29 therein and provided about its periphery with impeller blades 30 against which air discharged through the cup will impinge to cause the plate to revolve at a high rate.

The valve housings are each provided with valve stems 32 that extend from the housings and which are provided with valves 33 at their inner ends whereby the discharge of air is controlled. These valves may be moved to open position by inward movement of the stems and this is accomplished upon rotatable movement of the rod 13 by mechanism comprising crank levers 37 supported pivotally from the valve housings and connected to rod 13 by levers 35 and links 36 and which have lever arms 39 engaging the valve stems 32 to move them inwardly when the rod is rotated.

Oil for the pans is contained in an elevated tank 40 and may flow by gravity through a pipe 41 into a header 42 from which feed pipes 43 are extended into the housing and which at their inner ends extend through the valve housings 26 and are turned upwardly into the cups 27 centrally of the air connections. Over the ends of these pipes are mounted deflector plates 45, as shown in Figure 4, whereby the oil will be caused to be sprayed into the cups.

Control valves 46 are located in each of the feed pipes 43 and these have stems 47 whereby the valves may be rotated from open to closed position. Each stem has a control lever 48 and these are connected by means of links 49 with lever arms 50 that are fixed rigidly to rod 13. When rod 13 is rotated it effects simultaneous opening of all of the valves of the air and oil delivery pipes. Oil that is delivered into the cups is taken up by the air rushing upwardly and is discharged in a finely atomized condition through the perforations of the impeller wheels at the upper ends of the cups and is sprayed by air over the inner surfaces of the pans.

If it is desired to use melted lard in place of oil, the lard may be kept in a heated condition by heating the tank and feed pipe with steam. This could be accomplished by enclosing the delivery pipes within a steam jacket 55 as shown in Figure 7 or by enclosing the same within an electric heating element as is shown in Figure 3.

In the base of the housing we have provided a drainage pipe 60 beneath which a cup 61 may be located to catch all wasted oil.

With the device so constructed, its operation would be as follows: First, a die 5 of the proper size is selected and located within the opening 4 of the top 3, so that it is held by the lever arm 12 in an upwardly inclined position. The pans are then placed on the die, as shown in Figure 4, and pressure is applied downwardly so that the dies moved downwardly to horizontal position. This downward movement of the die causes the levers 12—12' to swing downwardly and the cross rod 13 to be rotated thereby. Rotation of the cross rod, by the mechanism shown, effects the opening of the air and oil valves so that the oil will be delivered into the mixing cups where it is blown by the air delivered through the cups, upwardly against and through the revolving disks 28 and is atomized and thrown thereby over the entire inner surfaces of the pans. When pressure is removed from the pans, the die will be raised by means of the springs 16 pulling on the lever arms 12—12' and this will cause the rod 13 to be rotated back to normal position against stops 17 and the valves to be closed.

A device so constructed will greatly expedite the work of oiling or greasing the pans and will do it in a better and more sanitary way than is possible to do by hand.

Having thus described our invention, what we claim as new therein and desire to secure by Letters Patent is:

1. In a pan oiling device, a housing having a top opening, a pan supporting die disposed pivotally within the housing and having openings therethrough over which pans to be oiled may be placed, an oil container, a container for air under pressure, delivery pipes leading from the containers to discharge into the said pans and control valves for the pipes operable by pivotal movement of the pan support.

2. In a pan oiling device, a housing having a top opening, a pan supporting die disposed within the opening and adapted to pivot along the edge on one edge of the opening having openings therethrough over which pans to be oiled may be placed, an oil container, a container for air under pressure, delivery pipes leading from the containers to discharge through the die openings into the said pans, control valves for the pipes, a rock shaft having operable connection with each of the valves and levers fixed to the shaft engageable by the pan supporting die and operable by the latter to rotate the shaft to move the valves to open position.

3. A pan oiling device comprising a yieldable pan supporting die having a plurality of openings therethrough over which pans to be oiled may be placed, an elevated oil container, a container for air under pressure, a plurality of upwardly opening cups located beneath the die opening feed pipes leading from the oil and air containers into the cups, control valves in said pipes and means operable by movement of the pan supporting die to move the valves to open position.

4. A pan oiling device of the character described comprising a housing having a top opening, a pan supporting die yieldably mounted in said opening and having a plurality of openings therein over which pans may be placed for oiling, an elevated oil container, a container for air under pressure, a plurality of upwardly opening cups mounted within the housing beneath the pans, feed pipes leading from the oil and air containers into the cups, control valves in said pipes and means operable by downward movement of the pan support to open the valves whereby oil is discharged into said cups and is blown by the air into the pans.

5. In a pan oiling device a movable pan support having an opening over which a pan to be oiled may be placed, an upwardly opening cup located beneath the said opening, an air delivery pipe leading into the base of the cup, an oil delivery pipe leading into the base of the cup centrally within the air delivery pipe, valves in said air and oil delivery pipes and means operable by movement of the pan support to move the valves to open and closed position.

6. In a pan oiling device a movable pan support having an opening therein over which a pan to be oiled may be placed, an upwardly opening cup located beneath the said opening, a disk rotatably supported over the end of the cup having perforations therein and impeller blades at its edges, an air delivery pipe leading into the base of the cup, an oil delivery pipe leading into the cup centrally within the air delivery pipe, a deflector plate supported over the end of the oil delivery pipe, valves for controlling the flow of air and oil through said delivery pipes and means operable by movement of the pan support to open and close the valves for the purpose set forth.

7. A pan oiling device comprising a housing having a top opening, a pan supporting die mounted yieldably in said top opening and having openings therein over which pans to be oiled may be placed, a plurality of upwardly opening cups located within the housing beneath the openings of the pan support, a container for air under pressure, an elevated oil container, a header having a pipe connection with the air container and having pipe connections leading into the lower ends of each cup, a header connected with the oil container having pipe connections leading into the base of each cup centrally within the air connections, valves in said oil and pipe connections, a cross-rod rotatably mounted in the housing, levers fixed to said rod engageable with the pan support whereby movement of the latter will effect rotation of the rod and means connecting each of the valves with said rod whereby they will be opened upon rotation of the rod.

8. A pan oiling device comprising a housing with a drainage opening in its base and having a top opening, a pan supporting die pivotally mounted within the said top opening having a plurality of openings therein over which pans to be oiled may be placed, an elevated oil container, a container for air under pressure, upwardly opening cups mounted within the housing beneath the openings of the pan supporting die, a pipe header connected with the air container having feed pipes therefrom opening into the base of the said cups, a header connected with the oil container having feed pipes leading into the base of the cups centrally within the air connections, a cross-rod rotatably mounted within the housing beneath the said cups, lever arms fixed to the said rod and engaging the pan support, springs connected with said levers and with the housing to yieldably retain the pan support in a raised position, valves in each of the oil and air feed pipes, lever arms fixed to the cross-rod and with said valves whereby depression of the pan support will effect rotation of the cross-rod and will move the valves to open position to deliver oil and air into the cups.

Signed at Seattle, King County, Washington this 7th day of April 1923.

PEARL M. COOK.
GUST E. RASMUSSEN.
GILBERT W. SKINNER.